United States Patent
Baribault

(10) Patent No.: US 9,841,579 B2
(45) Date of Patent: Dec. 12, 2017

(54) MULTIPLE-FIBER CONNECTOR INSPECTION

(71) Applicant: EXFO INC., Québec (CA)

(72) Inventor: Robert Baribault, Québec (CA)

(73) Assignee: EXFO INC., Quebec (CA)

( * ) Notice: Subject to any disclaimer, the term of this patent is extended or adjusted under 35 U.S.C. 154(b) by 556 days.

(21) Appl. No.: 14/468,453

(22) Filed: Aug. 26, 2014

(65) Prior Publication Data

US 2015/0092043 A1 Apr. 2, 2015

Related U.S. Application Data

(60) Provisional application No. 61/883,397, filed on Sep. 27, 2013.

(51) Int. Cl.
*G02B 7/18* (2006.01)
*G02B 7/182* (2006.01)
(Continued)

(52) U.S. Cl.
CPC ............ *G02B 7/1822* (2013.01); *G01M 11/31* (2013.01); *G02B 7/003* (2013.01); *H04N 5/2252* (2013.01); *H04N 5/2254* (2013.01)

(58) Field of Classification Search
None
See application file for complete search history.

(56) References Cited

U.S. PATENT DOCUMENTS

| 5,127,725 A | 7/1992 | Mueller et al. |
| 6,466,366 B1 | 10/2002 | Dominique |

(Continued)

FOREIGN PATENT DOCUMENTS

| CN | 2463847 Y | 12/2001 |
| CN | 101561260 A | 10/2009 |
| CN | 102037309 A | 4/2011 |
| CN | 102645178 A | 8/2012 |
| CN | 102997869 A | 3/2013 |

OTHER PUBLICATIONS

Kingfisher International, KI 6610 Series FiberSafe Microscope, http://www.kingfisherfiber.com/Fiber-Optic-Test-Equipment/KI6610-Fiber-Microscope/6610-Fiber-Microscope.htm; Printed Date: Dec. 1, 2014; Posted Date: Unknown.
Kingfisher International, Microscope Connector Adaptors, http://www.kingfisherfiber.com/Fiber-Optic-Test-Equipment/Options/Microscope-Adaptors/Scope-Adaptors.htm; Printed Date: Dec. 1, 2014; Posted Date: Unknown.
Seikoh Giken USA Inc., CI-1000 Fiber Optic Connector Video Inspector, http://www.photonlines.fr/images/stories/Telecom-pdf/CI-1000%20microscope.pdf; Printed Date: Dec. 1, 2014; Posted Date: Unknown.

(Continued)

*Primary Examiner* — Eileen Adams
(74) *Attorney, Agent, or Firm* — Erise IP, P.A.

(57) ABSTRACT

A fiber inspection system for inspecting optical-fiber endfaces of a multiple-fiber connector is provided that includes a housing structure, a mating interface fixed relative to the housing structure for interfacing with the multiple-fiber connector, and an imaging assembly. The imaging assembly is enclosed in the housing structure and defines an inspection plane and an image plane, at least a plurality of the optical-fiber endfaces being disposed on the inspection plane, to within a focusing range, when the multiple-fiber connector is mated to the mating interface. The imaging assembly also defines an imaging axis between an inspection point on the inspection plane and a detection point on the image plane, and includes an alignment module disposed between the inspection plane and the image plane and controllable to move the inspection point across the inspection plane for selectively inspecting one or more of the optical-fiber endfaces.

18 Claims, 13 Drawing Sheets

(51) Int. Cl.
*H04N 5/225* (2006.01)
*G02B 7/00* (2006.01)
*G01M 11/00* (2006.01)

(56) References Cited

U.S. PATENT DOCUMENTS

| | | | |
|---|---|---|---|
| 6,751,017 B2 | 6/2004 | Cassady | |
| 6,879,439 B2 | 4/2005 | Cassady | |
| 7,042,562 B2 | 5/2006 | Kiani et al. | |
| 7,239,788 B2 | 7/2007 | Villeneuve | |
| 7,336,884 B2 | 2/2008 | Zhou et al. | |
| 8,104,976 B2 | 1/2012 | Zhou et al. | |
| 2007/0046917 A1* | 3/2007 | Tel | G03F 7/70666 355/67 |
| 2010/0290744 A1* | 11/2010 | Zhou | G02B 6/3833 385/89 |
| 2014/0268114 A1* | 9/2014 | Zhou | B08B 5/02 356/73.1 |

OTHER PUBLICATIONS

Yeilding, Mike, AT&T Fiber Optic Connector & Adapter Inspection and Cleaning Standards, ATT-TP-76461, Issue 5, Jun. 14, 2013.
JDSU, FBPT Standard Inspection Tips Guide, http://www.specialized.net/Specialized/Assets/ProductSpecifications/718X225.PDF; Printed Date: Dec. 1, 2014; Posted Date: Unknown.
Lightel, Rugged dual video microscope for the field, ViewConn Plus Connector Inspection and Cleaning, http://lightel.com/products/viewconn-plus.pdf; Printed Date: Dec. 1, 2014; Posted Date: Unknown.
Sumix, Inspection Probes, http://www.sumix.com/probes/index.html; Printed Date: Dec. 1, 2014; Posted Date: Unknown.
Search Report for corresponding Chinese application No. 2014104899859 dated May 24, 2017 (English Translation).
First Office Action in corresponding Chinese application No. 2014104899859 dated May 24, 2017 (English Translation).

* cited by examiner

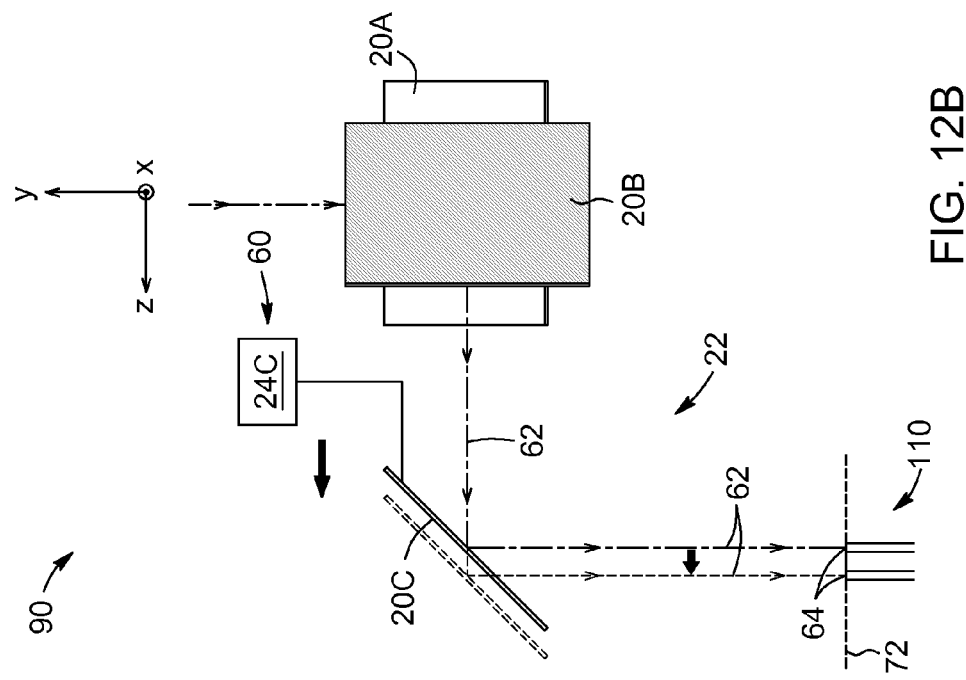
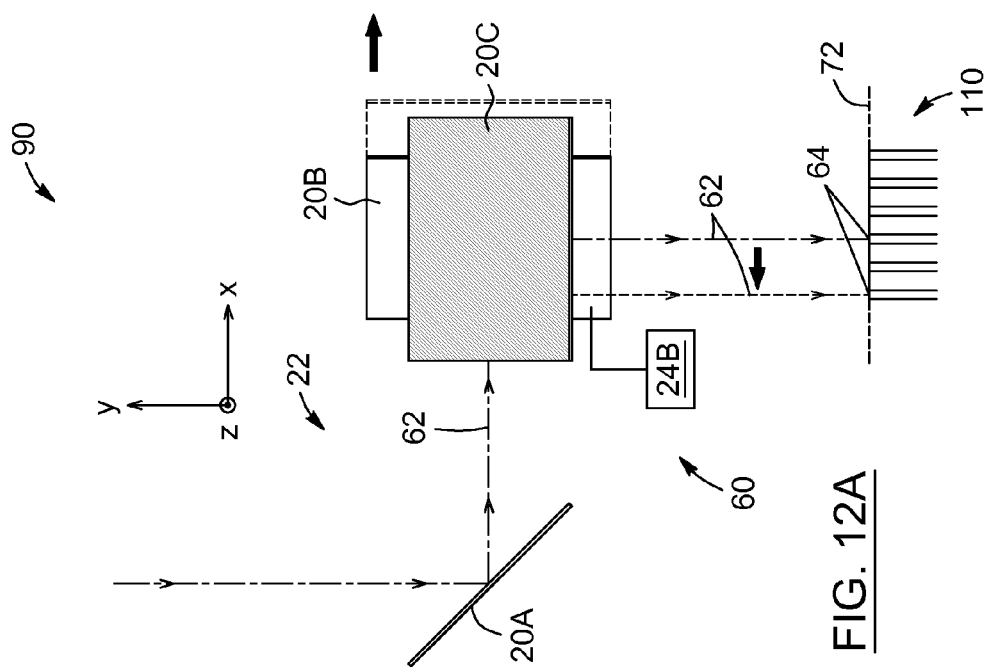

MULTIPLE-FIBER CONNECTOR INSPECTION

RELATED PATENT APPLICATION

This patent application incorporates by reference, in its entirety, and claims priority to U.S. Provisional Patent Application No. 61/883,397, filed Sep. 27, 2013.

TECHNICAL FIELD

The technical field generally relates to optical-fiber connector inspection, and more particularly to systems for inspecting multiple-fiber connectors, suitable for field-portable applications to fiber-optic communication networks.

BACKGROUND

Optical-fiber networks lie at the core of modern telecommunication systems and infrastructures. Employing optical fibers for transmitting information involves particular care to ensure efficient propagation and reception of optical signals. The quality and cleanliness of endfaces of optical-fiber connectors represent important factors for achieving adequate system performances, and any contamination of or damage on the mating surface of an optical-fiber connector may severely degrade signal integrity. As connectors are susceptible to defects that may not be immediately discernible by the naked eye, the development of accurate inspection techniques is desirable. This is notably true in the case of multiple-fiber connectors (MFCs), which are commonly used to mate fiber ribbon cables.

In order to acquire images and inspect the optical-fiber endfaces in an MFC, the MFC-under-test is commonly moved in a transverse fashion relative to the imaging axis of an inspection microscope. U.S. Pat. No. 6,879,439 (Cassady), U.S. Pat. No. 7,239,788 (Villeneuve) and U.S. Pat. No. 8,104,976 (Zhou et al.) are all examples of solutions relying on such relative mechanical displacement means. These solutions are implemented in an accessory, often termed a "tip". The tip is attached to the inspection microscope and provides the relative transverse displacement of the MFC-under-test with respect to the microscope, which in turn allows for a selective alignment of any particular optical-fiber endface with the imaging axis of the microscope. A drawback of this approach is that it renders the microscope and tip assembly fragile when submitted to shocks and vibrations. Another drawback is that the movement needed for this approach is imprecise due to the mechanical play associated with the moving parts inside the tip, which may lead to uncertainty as to which fiber is inspected. This may be particularly observed in applications where the MFC-under-test is inserted into a bulkhead adapter that is mounted on a patch panel. In this case, the tip is manually inserted into the bulkhead adapter for inspection of the MFC, which may result in the inadvertent application of a force couple on the tip and an uncontrolled positioning of the fibers.

Accordingly, there exists a need in the art for providing an improved, more robust, inspection system for inspecting optical-fiber endfaces of MFCs that can alleviate at least some of the above-mentioned drawbacks.

SUMMARY

In accordance with an aspect of the invention, there is provided a fiber inspection system for inspecting optical-fiber endfaces of a multiple-fiber connector. The fiber inspection system includes:

- a housing structure;
- a mating interface held in a fixed relationship relative to the housing structure and configured to interface with the multiple-fiber connector; and
- an imaging assembly enclosed in the housing structure and defining an inspection plane and an image plane, at least a plurality of the optical-fiber endfaces being disposed on the inspection plane, to within a focusing range, when the multiple-fiber connector is mated to the mating interface, the imaging assembly defining an imaging axis between an inspection point on the inspection plane and a detection point on the image plane and including an alignment module disposed between the inspection and the image plane and controllable to move the inspection point across the inspection plane for selectively inspecting one or more of the optical-fiber endfaces of the multiple-fiber connector.

Advantageously, the alignment module is controllable to move the inspection point across the inspection plane for selectively inspecting one or more of the optical-fiber endfaces without moving the multiple-fiber connector with respect to the housing structure and mating interface of the inspection system.

In some embodiments, the alignment module can include an optical element and an actuator configured to act on the optical element in order to move the inspection point across the inspection plane. In some of these embodiments, the actuator may be configured for mechanical displacement of the optical element with respect to the housing structure, thereby moving the inspection point across the inspection plane to selectively inspect any one of the optical-fiber endfaces of the multiple-fiber connector. In other embodiments, the actuator may be configured to control the displacement of the inspection point across the inspection plane without requiring any corresponding displacement of the optical element. This may be achieved, for example, with an actuator capable of inducing an electrically-controlled change of the refractive index of the optical element, the change in refractive index in turn producing a displacement of the imaging axis. In such embodiments, the optical element may include a liquid crystal material and the actuator may be a suitable voltage generator.

In some embodiments, the inspection system can include a fiber inspection probe and a fiber inspection tip releasably connectable to the fiber inspection probe. In such embodiments, the fiber inspection tip is provided with the mating interface for interfacing with the multiple-fiber connector and includes a tip housing, and the fiber inspection probe includes a probe housing. The tip housing and the probe housing together define the housing structure of the inspection system when the fiber inspection tip is connected to the fiber inspection probe. Additionally, the alignment module may be disposed within the tip housing, or alternatively, within the probe housing. In either case, the relative positions of the multiple-fiber connector, mating interface, and probe and tip housings can advantageously remain mutually fixed during inspection.

In some embodiments, the displacement of the inspection point across the inspection plane may be accomplished, for example, by translating and/or rotating, via the actuator, a suitably-angled mirror within the inspection probe or the inspection tip. This proposed scheme may be automated to provide inspection of optical-fiber endfaces with little or no user intervention, thereby minimizing the risk of human error. This may be achieved, for example, by motorizing the mirror translation and/or rotation inside the probe or the tip.

According to another aspect of the invention, there is provided a fiber inspection tip connectable to a fiber inspection probe for inspecting optical-fiber endfaces of a multiple-fiber connector, the fiber inspection probe having a probe housing and defining, together with and when connected to the fiber inspection tip, an inspection plane and an image plane. The fiber inspection tip includes:

a mating interface configured to interface with the multiple-fiber connector so that, when the fiber inspection tip is connected to the fiber inspection probe, the mating interface is held in a fixed relationship with the probe housing and at least a plurality of the optical-fiber endfaces of the multiple-fiber connector is disposed on the inspection plane, to within a focusing range; and an alignment module disposed between the inspection plane and the image plane and providing, together with and when connected to the fiber inspection probe, an imaging axis between an inspection point on the inspection plane and a detection point on the image plane, the alignment module being controllable to move the inspection point across the inspection plane for selectively inspecting one or more of the optical-fiber endfaces of the multiple-fiber connector.

Other features and advantages of embodiments of the present invention will be better understood upon reading of preferred embodiments thereof with reference to the appended drawings.

BRIEF DESCRIPTION OF THE DRAWINGS

FIGS. 12A and 12B are top plan and right side elevation views of FIG. 11, respectively.

DETAILED DESCRIPTION

Figure 1:
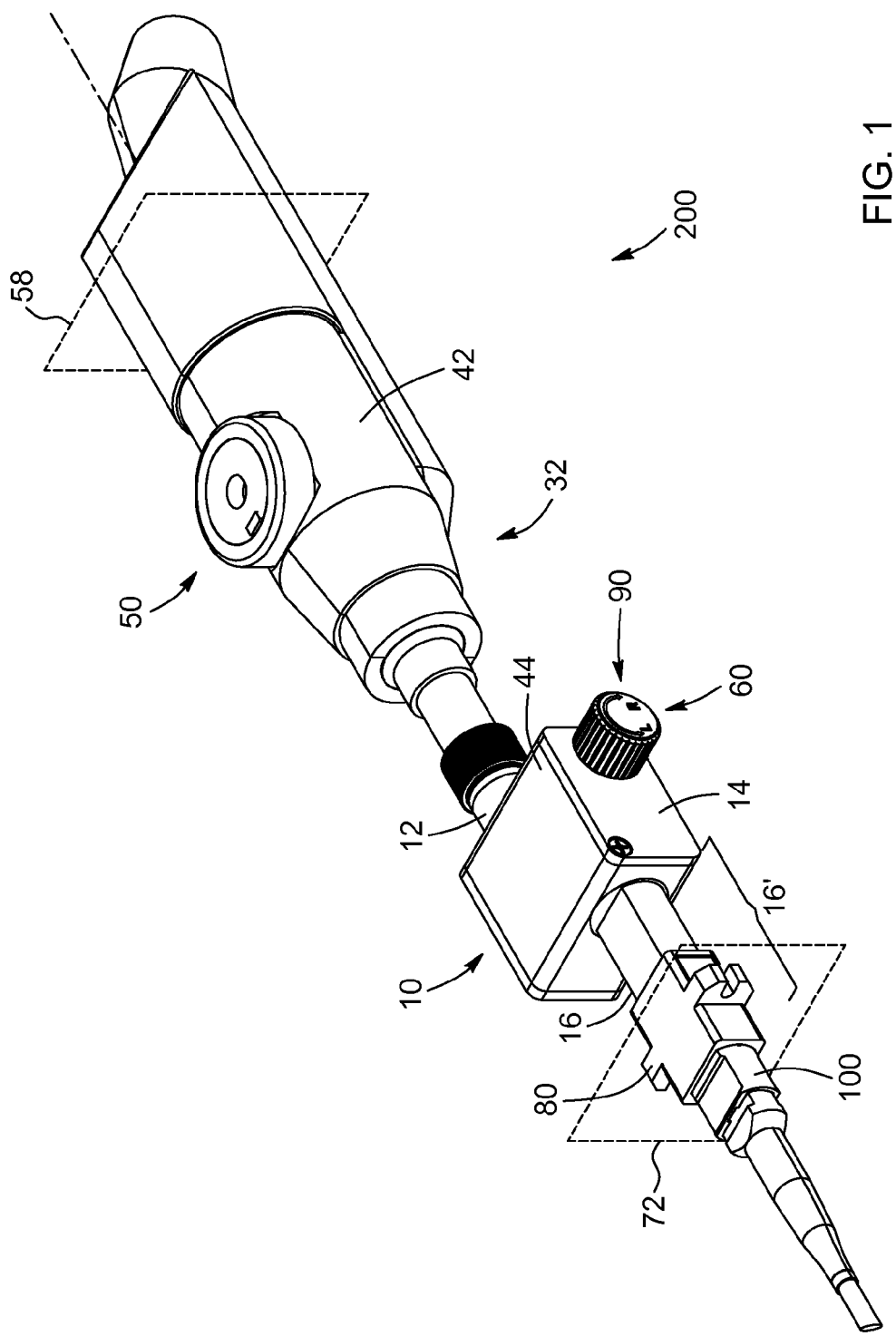
FIG. 1 is a general overview of a fiber inspection system in accordance with an embodiment, wherein the fiber inspection probe, the multiple-fiber inspection tip and the MFC-under-test (mated to a female-female adapter, such as a bulkhead adapter) are shown connected to one another.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments. Some mechanical and/or optical elements may also be omitted on some or all of the figures in order to better emphasize inventive aspects of the illustrated embodiments.

The present specification generally relates to a fiber inspection system for inspecting optical-fiber endfaces of a multiple-fiber connector (MFC). The MFC can be attached to a coupling device, such as bulkhead adaptor mounted on a patch panel. Broadly described, and as discussed in greater detail below, the fiber inspection system includes a housing structure, a mating interface fixed relative to the housing structure for interfacing with the MFC, and an imaging assembly enclosed in the housing structure and defining an inspection plane and an image plane.

The present specification also generally relates to a fiber inspection tip connectable to a fiber inspection probe for allowing inspection of optical-fiber endfaces of an MFC by the inspection probe. Broadly described, and as also discussed in greater below, the fiber inspection tip includes a mating interface for interfacing with an MFC to be inspected, and an alignment module.

Overview of Existing Challenges in Multiple-Fiber Connector Inspection

In situ inspection of fiber connectors is relevant to the optimization of fiber-optic networks, including data-center optical interconnects. A fiber connector, cleaned in accordance with accepted industry standards, minimizes optical loss and reflections, thus creating favorable conditions for a network to respect its specifications. Unclean connectors are often a cause of optical-network problems, and hence, in the event of trouble, it is generally desirable that connectors normally be verified before other possible sources of impairments.

Fiber-optic connectors can be categorized into single-fiber and multiple-fiber connectors, which respectively include the end portion of a single optical-fiber and the end portions of multiple fibers. As used herein, the end of a fiber end portion is referred to as a "fiber endface".

The conventional approach to acquire images and inspect the optical-fiber endfaces in an MFC is to mechanically move the MFC-under-test in a transverse fashion relative to the imaging axis of an inspection microscope. This transverse displacement of the MFC may involve a linear or angular motion employing mechanical parts. A drawback of this approach is that, in practice, mechanical parts enabling such a motion are generally associated with a certain degree of mechanical play. Such a mechanical play may translate into a residual uncontrolled movement of the image on the image sensor. It may thus hamper the sequential imaging of the fiber endfaces in the MFC-under-test, as it may render uncertain which fiber endface is actually being inspected, inasmuch as a fiber endface might have been accidentally skipped. In such a case, the user would likely need to re-initiate inspection of the entire MFC, resulting in wasted time.

This positional uncertainty can be exacerbated when the most distal part of the fiber inspection system (often designated as the "tip" and typically releasably detachable from the fiber inspection probe) is, for instance, inserted manually into the unmated side of a bulkhead adapter fixed on a patch panel. In many inspection applications, the user performing the inspection manually holds the fiber inspection probe to align it properly with the inspected MFC. The user's hand on the fiber inspection probe should then remain steady throughout the acquisition process. The mechanical play may then give rise to additional uncontrolled movement of the connector image, leading to difficulties for even a trained user to acquire a satisfactory image of MFCs using conventional fiber inspection systems.

Furthermore, in addition to increased susceptibility to mechanical play, when employing conventional fiber inspection systems, repeated application of a force couple on the tip when inserted into the unmated side of a bulkhead adapter fixed on a patch panel is likely to be conveyed to the moving mechanical parts of the tip. This increases the risk of damage to the mechanical parts of the tip.

Description of Exemplary Embodiments of the Fiber Inspection System and Tip

In contrast to existing MFC inspection systems and methods, embodiments of the fiber inspection system described herein can allow for inspection of optical-fiber endfaces to be carried out without relative movement between the MFC, the mating interface interfacing with the MFC, and the housing structure enclosing the imaging assembly. The absence of relative movement between the mating interface and the housing structure can be achieved by providing the imaging assembly with an alignment module. The imaging assembly, including the alignment module, provides an imaging axis between an inspection point (e.g., corresponding to the center of a selected fiber-optic endface) on an inspection plane and a detection point on an image plane. The alignment module is controllable to move the inspection point across the inspection plane in view of selectively inspecting one or more optical-fiber endfaces. In other words, embodiments of the fiber inspection system allow for a displacement of the imaging axis of the imaging assembly across the fiber endfaces to permit selective and/or sequential fiber endface inspection without having to displace the mating interface and/or housing structure of the fiber inspection system relative to the MFC-under-test. Of course, it will be understood that more than one fiber-optic endface could also be inspected in one image acquisition.

As described in greater detail below, the embodiments of the fiber inspection system described herein provide an approach that aims to solve or at least mitigate the aforementioned problems affecting existing systems. In particular, contrary to existing MFC inspection systems where a mechanical displacement of the probe relative to the MFC is implemented in a tip attached to the probe that interfaces with the MFC, embodiments of the inspection system allow for the imaging axis of the imaging assembly to be displaced from one fiber endface to another through a mechanical motion that does not alter the relative positions of the MFC, the mating interface interfacing with the MCF and the housing structure.

It will be understood that in embodiments where the fiber inspection system includes a probe and a tip connected to each other, the housing structure of the inspection system as a whole can be defined as the structure that results from the connection between the housing of the probe and the housing of the tip. As a result, any force that might be inadvertently applied to the housing structure, whether the force is applied to the probe or tip housing, will not or negligibly be applied to those parts of the alignment module responsible for the displacement of the imaging axis, and therefore will not lead to additional displacement of the image on the image sensor. Exemplary embodiments of the fiber inspection system will be now described.

Referring to FIGS. 1 to 6B, an embodiment of a fiber inspection system 200 for inspecting optical-fiber endfaces 110 of a multiple-fiber connector 100 is shown. The fiber inspection system 200 generally includes a housing structure 32, a mating interface 70 (see FIG. 2B) and an imaging assembly 150 (see FIG. 5) including an alignment module 90.

As used herein, the term "housing structure" refers to a component that provides an external casing or frame to the fiber inspection system and that defines a space for accommodating and supporting the imaging assembly of the inspection system. It will be understood that the housing structure of the inspection system may be formed as a single integral structure or from two or more housing sections mechanically connected to form a housing structure (e.g., probe and tip housing sections).

For example, turning briefly to FIG. 1, the inspection system 200 includes a fiber inspection probe 50 (which can also be referred to as a "fiber inspection microscope") and an inspection tip 10 releasably connectable to each other. The fiber inspection probe 50 and tip 10 respectively include a probe housing 42 and a tip housing 44 that together define the housing structure 32 of the inspection system 200 when the probe 50 and tip 10 are connected together. It will be understood that in such a case, the mating interface 70 is part of the fiber inspection tip 10, as better illustrated in FIG. 2B.

Referring back to FIGS. 1 to 6B, the mating interface 70 is held in a fixed relationship with the housing structure 32 and is configured to interface with the MFC 100. As a result, the mating interface 70 and the housing structure 32 of the inspection system 200 remain fixedly positioned both relative to each other and to the MFC 100 during inspection of the optical-fiber endfaces 110.

The imaging assembly 150 is enclosed in the housing structure 32 and defines an inspection plane 72 and an image plane 58. When the mating interface 70 is mated to the MFC 100, at least a plurality of the optical-fiber endfaces 110 is disposed, to within a focusing range, on the inspection plane 72. In the embodiments of the inspection system 200 described herein, the imaging assembly 150 can include components both within the probe housing 42 (e.g., image sensor 52, beam splitter 54, objective 56 in FIG. 5) and components within the tip housing 44 (e.g., optical element 22 and corrective optics 34 in FIG. 3).

As used herein, the term "imaging assembly" refers to the combination of optical, mechanical and/or electrical components that cooperate to form an image having a corresponding field of view encompassing at least a selected one of the optical-fiber endfaces of an MFC. For example, in FIG. 5, the optical-fiber endface 110/2 is encompassed in the field of view of the imaging assembly 150.

The term "inspection plane" refers herein to a plane extending across the imaging axis of the imaging assembly (such that a normal of the plane coincides with the imaging axis) and where it is assumed that the object to be viewed (e.g., one or more optical fiber optical-fiber endfaces of an MFC to be inspected) is to be positioned when the imaging assembly is designed for inspection. In particular, the imaging assembly is designed such that the "inspection plane", which is defined by the optical arrangement of the imaging assembly, is made to substantially coincide with the endface surface of the MFC within a focusing tolerance (i.e., depth of field), once focus is adjusted. Likewise, the term "image plane" refers to a plane extending across the imaging axis of the imaging assembly on which the image of the inspection plane (or a portion thereof) is focused (usually, the imaging axis will be normally incident on the image plane). It will be understood by one of ordinary skill in the art that the terms "inspection plane" and "image plane" are not to be construed as being limited to strictly planar surfaces, but are intended to cover any surface or region whose image can be acquired and on which such an image can be focused.

Figure 5:
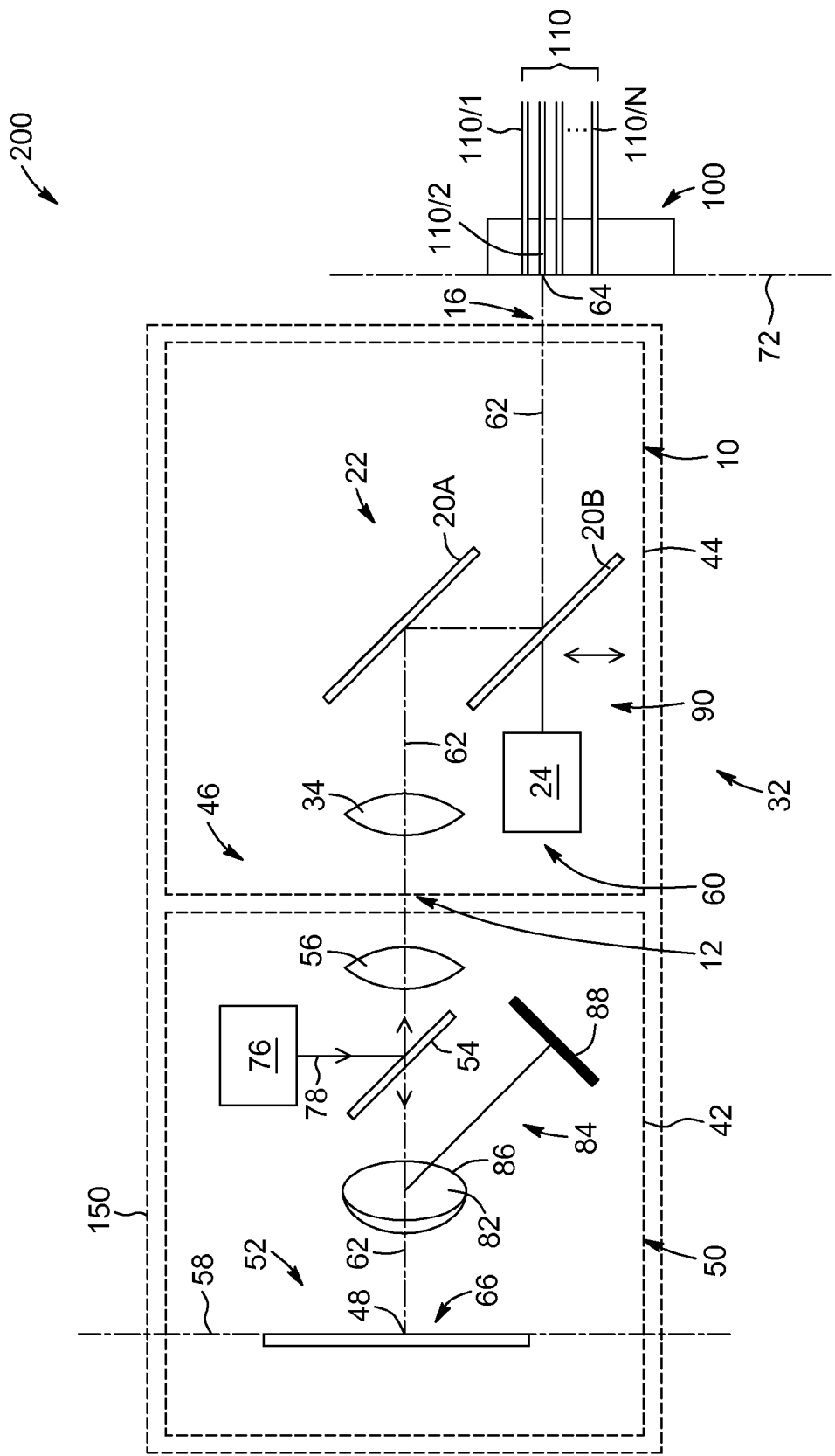
FIG. 5 is a schematic representation of optical components disposed along the fiber inspection probe, tip, and MFC-under-test between the image and inspection planes, in accordance with an embodiment.

Turning briefly to FIG. 5, when the mating interface 70 is mated to the MFC 100, the inspection plane 72 coincides with or is brought in close proximity to at least a plurality of the optical-fiber endfaces 110. This close proximity normally falls within the "focusing range" of the inspection system, that is, the range of positions of the fiber endfaces of the MFC relative to the mating interface over which the inspection system can be brought into focus so as to render the inspection plane and the MFC endface plane substantially coincident. In some embodiments, this focusing range can extend over approximately 6 mm, although this value should not be construed as being limitative and can differ in other embodiments.

The imaging assembly 150 provides an imaging axis 62 between an inspection point 64 (e.g., the selected fiber endface 110/2 in FIG. 5) on the inspection plane 72 and a detection point 48 on the image plane 58, and includes an alignment module 90 disposed between the inspection plane 72 and the image plane 58. As described in greater detail below, the alignment module 90 is controllable to move the inspection point 64 across the inspection plane 72 for selectively inspecting one or more of the optical-fiber endfaces 110 of the MFC 100. It will be understood that in embodiments where the fiber inspection system 200 includes a fiber inspection probe 50 releasably connectable to a fiber inspection tip 10 such that the housing structure 32 is defined by the combination of the probe housing 42 and the tip housing 44, the alignment module 90 can be enclosed either in the probe housing 42 or the tip housing 44.

Referring still to FIG. 5, in some embodiments, the imaging assembly 150 can include imaging optics 46, such as lenses, mirrors, filters and the like, disposed along or near the imaging axis 62 to direct light from the inspection plane 72 to the image plane 58 and bring the inspection point 64 (e.g., corresponding to the center of a selected fiber endface 110/2) on the inspection plane 72 into focus as the detection point 48 on the image plane 58. The imaging assembly 150 can also include an image sensor 52 having a detection surface 66 positioned at the image plane 58 to capture a displayable image of the one or more selected optical-fiber endfaces 110 of the MFC 100. The image sensor 52 may be embodied by a conventional optical sensing device including, but not limited to, a charge-coupled device (CCD), a complementary metal-oxide-semiconductor (CMOS) array, or other optical sensors capable of producing an image of a scene within their field of view.

The imaging assembly 150 defines the imaging axis 62 extending from the detection surface 66 toward the optical-fiber endfaces 110 of the MFC 100. As used herein, the term "imaging axis" denotes the optical axis of the imaging optics 46 of the imaging assembly 150 such that when a physical object is disposed along the imaging axis, the part of the physical object within the field of view of the imaging assembly 150 will be imaged on the image sensor (or, in case of direct optical viewing, the eye). The imaging axis 62 will typically be perpendicular to (and somewhat centered on) the image sensor 52.

The imaging assembly 150 may further incorporate focusing means to ensure that the image plane 58 is located at a desired position along the imaging axis 62 to provide an "in-focus" image of one or more fiber endfaces 110 on the inspection plane 72. In embodiments employing a planar image sensor 52, this desired position along the imaging axis 62 would coincide with the detection surface 66 of the image sensor 52, which also corresponds to the fiber endfaces 110 being coincident with the inspection plane 72. In such a case, the image would be "real". As known in the art, such focusing means may include a small controlled displacement of a lens or another optical component along the imaging axis, and/or involve a small physical displacement of the image sensor 52 along the imaging axis 62, for instance.

In other embodiments, no image sensor is employed. Rather, the imaging assembly is suitably arranged to include an ocular or equivalent optics, enabling the "naked" eye to view a "virtual" image of the image plane at a comfortable accommodation distance. Appropriate focusing means, well known in the art, may still be used.

Referring still to FIG. 5, the alignment module 90 of the imaging assembly 150 is disposed on the imaging axis 62 between the image plane 58 and the inspection plane 72. The alignment module 90 is controllable to move the inspection point 64 across the inspection plane 72, so as to selectively position any one of the optical-fiber endfaces 110 of the MFC 100 within the field of view of the image projected onto the image plane 58. In some embodiments, the inspected endface 110 is approximately centered within the field of view although it need not be the case in other embodiments.

Referring back to FIGS. 1 to 6B, the alignment module 90 can include an optical element 22 and an actuator 60 configured to act on the optical element 22 (e.g., by controlling its position, orientation and/or optical properties) in order to move the inspection point 64 across the inspection plane 72. As described below, in some embodiments, the actuator 60 can act on the optical element 22 via a mechanically-actuated movement of the optical element 22 or an electrically-induced change in refractive index of the optical element 22.

In FIG. 5, the optical element 22 includes a reflective optical element such as a mirror 20B which intercepts the imaging axis 62, and the actuator 60 includes a mechanical actuator such as a linear actuating component 24 configured for translating the movable mirror 20B of the optical element 22 with respect to the housing structure 32, without relative movement between the housing structure 32 and the mating interface 70. This displacement of the movable mirror 20B results in a movement of the inspection point 64 across the inspection plane 72 and enables selective inspection of any one of the optical-fiber endfaces 110 of the MFC 100.

Further alternative embodiments for the alignment module 90 will be discussed in greater detail below, with reference to FIGS. 7 to 10.

Referring back to FIGS. 1 to 6B, the inspection system 200 includes a fiber inspection probe 50 (or microscope) and an inspection tip 10 connectable to each other, preferably in a releasable manner. In this exemplary embodiment, the fiber inspection tip 10 is provided with the mating interface 70 configured to interface with the MFC 100 such that its fiber endfaces 110 coincide with the inspection plane 72, while the fiber inspection probe 50 is provided with an image sensor 52 having a detection surface 66 that coincides with the image plane 58 when the focus is optimal (see FIG. 5). As mentioned above, the inspection probe 50 and the tip 10 can respectively include a probe housing 42 and a tip housing 44, which together form the housing structure 32 of the inspection system 200 when the probe 50 and tip 10 are connected together. Additionally, the housing structure 32 remains fixedly positioned with respect to the mating interface 70 when the inspection tip 10 is connected to the inspection probe 50, even upon activation of the actuator 60 of the alignment module 90 (see FIGS. 3, 6A and 6B).

It will be understood that in some embodiments, the inspection tip may be intended for use and sale as a single component, and be adapted for connection with one or more commercially available fiber inspection probes. Such probes originally were designed for inspection of single-fiber connectors via an appropriate releasably detachable tip (in this case just an appropriate mating interface), and hence do not incorporate means enabling transverse displacement of the imaging axis. In such embodiments, the tip can include a mating interface configured to interface with the MFC. When the fiber inspection tip is connected to the fiber inspection probe, the mating interface is held in a fixed relationship with the fiber inspection probe and at least a plurality of the optical-fiber endfaces of the MFC are disposed on the inspection plane of the probe encompasses, to within the aforesaid focusing range.

The fiber inspection tip then also includes an alignment module controllable to move the inspection point across the inspection plane for selectively inspecting one or more of the optical-fiber endfaces of the multiple-fiber connector. The alignment module provided in the tip may include an optical element and an actuator, such as described above.

As mentioned hereinabove, commercially available fiber inspection probes are typically designed for use with fiber inspection tips that are made for inspecting single-fiber connectors. The optical length of such fiber inspection tips is typically shorter than that obtained with embodiments of the fiber inspection tip for inspecting MFCs. For at least that reason, the focal length of the fiber inspection tip may need to be adjusted. Accordingly, the alignment module may include corrective optics (e.g., a lens) to compensate for different positions of the distal end of the mating interface relative to the probe. In particular, the corrective optics can be configured to compensate for the optical length difference required by the addition of the alignment module when the tip is connected to the probe. It is to be understood that the corrective optics can comprise a single lens or multiple lenses distributed along the imaging axis.

Alternatively, in other embodiments, the inspection system may be embodied as a single device with no releasable parts (other than perhaps a releasably detachable mating interface, to allow mating to different MFC types), and which incorporates the imaging assembly including the alignment module and, optionally, an image sensor.

Figure 2:
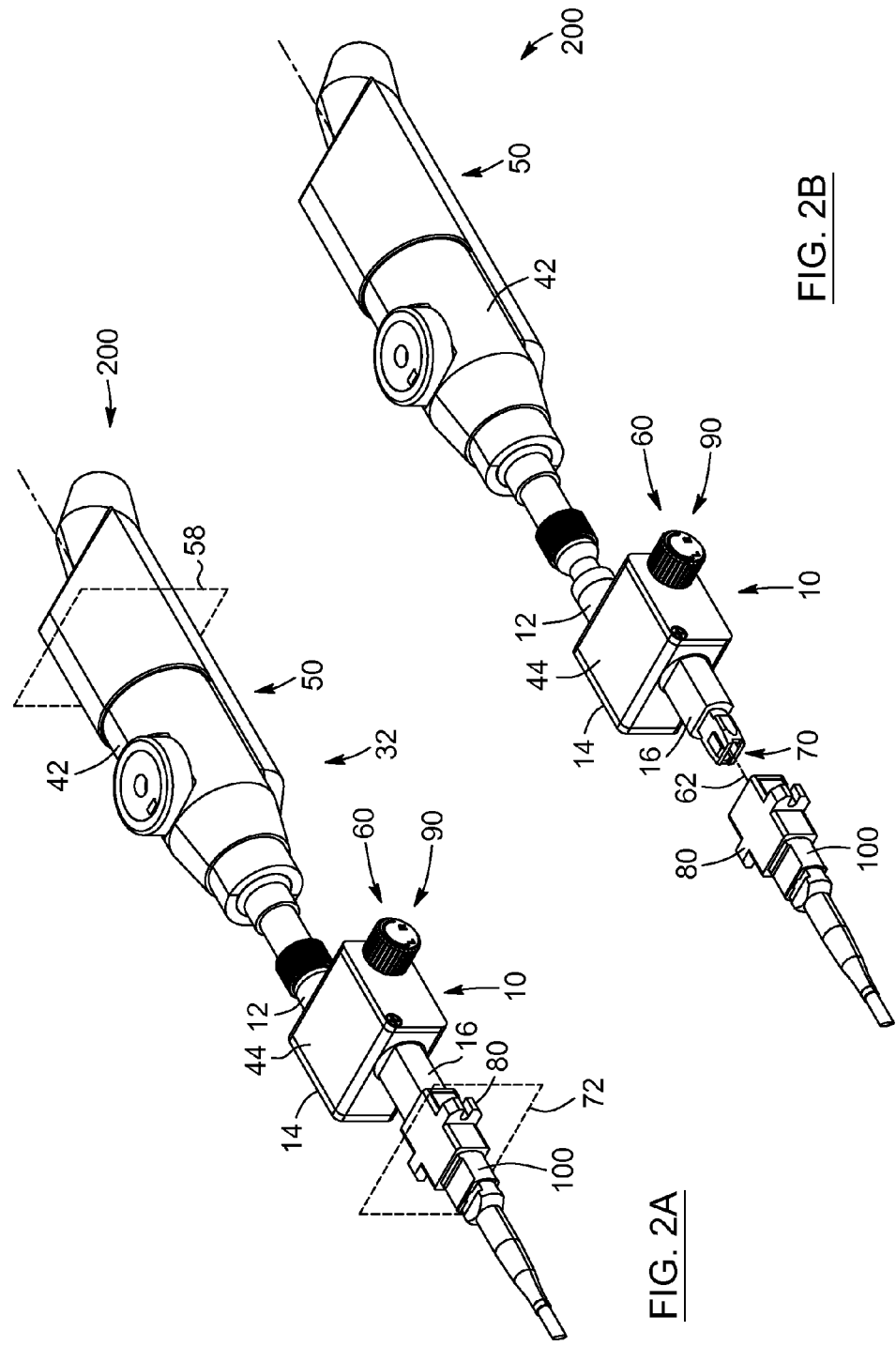
FIGS. 2A and 2B show the connectivity between the MFC-under-test, the inspection tip and the fiber inspection probe of the inspection system of FIG. 1.
Figure 3:
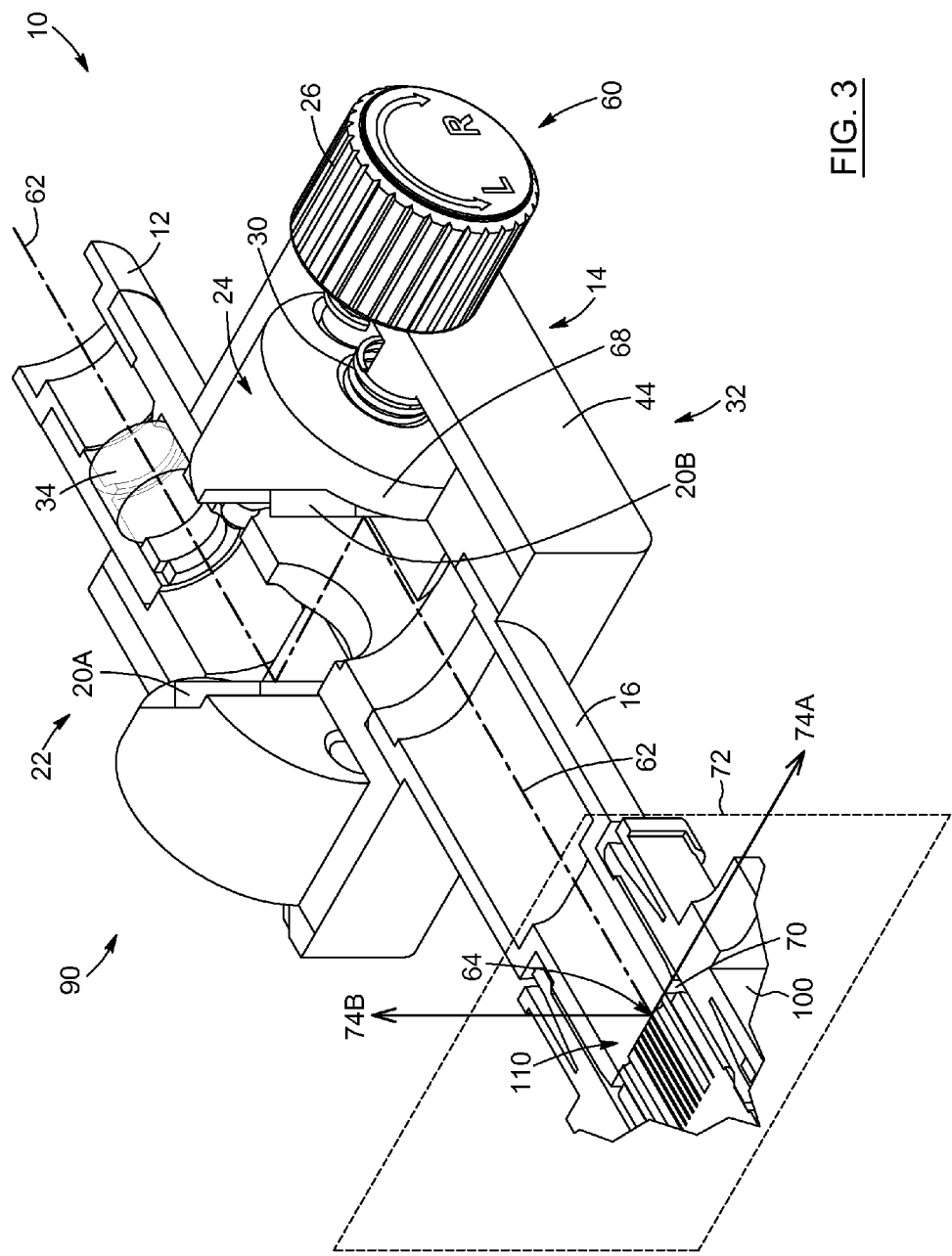
FIG. 3 is an isometric view of the inside of the multiple-fiber inspection tip of the fiber inspection system of FIG. 1, showing an alignment module including an optical element embodied by two parallel mirrors and a linear actuator embodied by a lead-screw-driven mechanism for translating one of the mirrors relative to the other. The translation of the movable mirror through actuation of the linear actuator allows for the inspection point to be linearly displaced across the inspection plane in order to scan between optical-fiber endfaces of the multiple-fiber connector.

Referring to FIGS. 1 to 3, in some embodiments, the inspection tip 10 has a distal end 16, 16' releasably connectable to the MFC 100, a proximal end 12 releasably connectable to the fiber inspection probe 50 and a body section 14 extending between the distal end 16, 16' and the proximal end 12. The proximal end 12 may include corrective optics 34 (see FIG. 3) and means for attachment of the tip 10 to the portable fiber inspection probe 50. In this embodiment, the distal end 16 of the tip 10 defines the mating interface 70 of the inspection system 200 for interfacing with the MFC 100.

In some embodiments, the distal end 16 may include a "male" adapter for insertion into the "open" end of a patch-panel bulkhead adapter 80 (not shown here as actually mounted in a patch panel). The opposing end of the bulkhead adapter 80 would normally be mated to the corresponding MFC-under-test 100. Alternatively, if the distal end 16' of the tip 10 is of an appropriate mechanical form (e.g., a "female" adapter housing suitable for receiving the MFC 100), one may inspect the MFC 100 of a fiber ribbon cable (i.e., not connected to a patch panel) by directly mating it to the (suitably-adapted) tip 10. To this end, the combination of a bulkhead adapter connected to the "male" distal end 16 may serve as the appropriate mating interface 16' for ribbon-cable inspection. It will be understood that FIG. 1 is meant to encompass both of these possibilities.

Referring to FIGS. 2A and 2B, there is shown line-drawings of the inspection system 200 of FIG. 1, where the MFC-under-test 100 and the inspection system 200 are mutually attached (FIG. 2A) and detached (FIG. 2B). In the latter case, it is the MFC-under-test 100 that is mated to a bulkhead adapter 80 (e.g., for patch-panel connector inspection, although the patch panel itself is not shown in the figure). In this embodiment, the alignment module 90 of the inspection system 200 is entirely enclosed within the tip housing 44.

FIG. 3 shows an overview of the internal workings of the alignment module 90 of the inspection system 200, including the optical element 22 and the actuator 60 associated thereto, in accordance with an embodiment. Corrective optics 34 may be disposed at the proximal end 12 of the fiber inspection tip 10 to increase the focal length of the probe 50 from its nominal value (e.g., for applications where a simple single-fiber connector may be inspected) to a corrected value when the tip 10 is connected to the probe 50. In such a case, this corrected value will correspond to a focal length of the fiber inspection system 200 as a whole. In FIG. 3, the corrective optics 34 is embodied by a lens, but other or additional optical components could be employed. It is to be noted that in other embodiments, the corrective optics 34 may be replaced by one or more curved mirrors of appropriate radius of curvature (e.g., of parabolic or spherical shape, depending upon desired design tolerances), or by a suitable combination of lenses and curved mirrors.

In FIG. 3, the optical element 22 of the alignment module 90 intercepts the imaging axis 62 of the imaging assembly. In this embodiment, the optical element 22 is embodied by a first mirror 20A and a second mirror 20B parallel to each other and preferably both oriented at 45 degrees with respect to the imaging axis 62. Conveniently, the first mirror 20A is fixed and the second mirror 20B is movable with respect to the first mirror 20A. For this purpose, the actuator 60 may include a linear actuating component 24 mechanically coupled to the second mirror 20B to translate the second mirror 20B relative to the first mirror 20A.

Still referring to FIG. 3, in some embodiments, the linear actuating component 24 is a lead-screw-driven mechanism that includes a base 68 on which the second mirror 20B is mounted and a lead screw 28 rotatably engaging the base 68 such that axial rotation of the lead screw 28 linearly displaces the base 68 along the lead screw 28, thereby causing translation of the second mirror 20B relative to the first mirror 20A and, in turn, displacement of the inspection point across the inspection plane 72 along a first direction 74A. In some embodiments, the lead screw 28 can be provided with a knob 26 for facilitating manual rotation of the lead screw 28 by a user. In such a case, the knob 26 can be conveniently located outside of the body section 14 of the tip 10 for easy access by the user.

It should be noted that in the embodiment of FIG. 3, the focus will typically need to be re-adjusted (using the focusing means) after each translation of the second mirror 20B, that is each time the inspection point is moved across the inspection plane 72.

It will be understood that in the embodiment of FIG. 3, the actuator 60 defined by the base 68, the lead screw 28 and the knob 26 allows for the displacement of the second mirror 20B with respect to the housing structure 32 without relative movement between the housing structure 32, the mating interface 70 and the MFC 100 under inspection. In particular, the linear displacement of the second mirror 20B toward and away from the first mirror 20A upon rotation of the lead screw 28 allows for the alignment of the imaging axis 62 extending between the image plane 58 and the inspection plane 72 with a selected optical-fiber endface 110 of the MFC 100. It will also be understood that the probe and tip housings 42, 44 effectively act and serve as rigid "exoskeletons" that ensure that external forces are only applied to rigid (i.e., non-moving) components of the probe 50 and tip 10. An example of such an external force is, as discussed hereinabove, the force couple arising when a technician-held probe is employed to perform inspection from the unmated side of a bulkhead adapter fixed on a patch panel.

Figure 4:
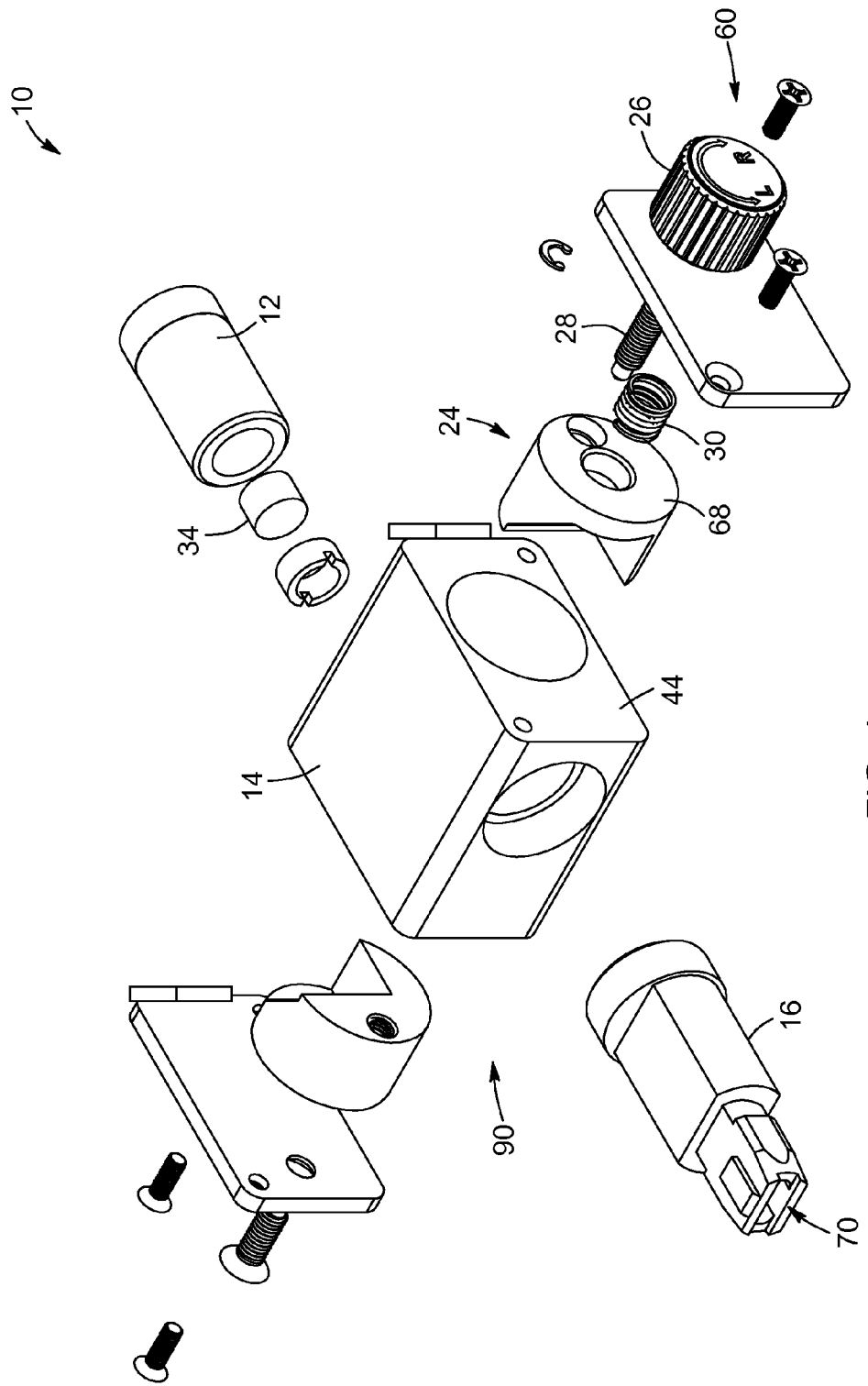
FIG. 4 is partially exploded view of the inspection tip of FIG. 2B. The movable mirror is moved by means of a lead-screw-driven mechanism having sufficient resolution to center the image of the selected fiber endface near an imaging axis of the fiber inspection probe.

FIG. 4 is an exploded view illustrating the mechanical components of the embodiment of the inspection tip 10 of FIGS. 1 to 3, in particular the lead screw 28, as well as an anti-backlash spring 30 for ensuring a smooth operation of the lead screw 28. In the illustrated embodiment, the distal end 16 of the ("male") tip 10 is preferably of a form suitable for the adapter type of the MFC-under-test.

FIG. 5 is a simplified schematic illustrating various optical components that can be disposed between the inspection plane 72 and the image plane 58 defined by the imaging assembly 150, in accordance with an embodiment of the fiber inspection system 200. In this embodiment, the inspection system 200 includes a fiber inspection probe 50 and a multiple-fiber inspection tip 10, and is configured for inspecting optical-fiber endfaces (110/1, 110/2 . . . 110/N) of an MFC 100. As shown in FIG. 5, the optical element 22 of the alignment module 90 is disposed along the imaging axis 62 connecting the detection point 48 on the image plane 58 and the inspection point 64 on the inspection plane 72 and directs the imaging axis 62 of the imaging assembly 150 onto one endface 110/2 of the optical-fiber endfaces (110/1, 110/2 . . . 110/N) of the MFC-under-test 100.

In the embodiment of FIG. 5, the fiber inspection probe 50 includes an objective 56, for example a lens, whose focal length may be optimized for use in applications where the tip 10 is not attached to the probe 50 (e.g., for inspection of single-fiber connectors). In this case, the focal length of corrective optics 34 may be suitably chosen to compensate for the extra distance between the "object" (i.e., the fiber endface 110/2) and the image plane (i.e., image sensor 52) caused by connecting the tip 10 to the probe 50.

Still referring to FIG. 5, the fiber inspection system 200 may further include an illumination source 76 configured to project illumination light 78 onto the selected optical-fiber endface 110/2 of the MFC 100 during inspection. The illumination source 76 can be embodied by a light-emitting diode (LED) or an incandescent bulb. A beam splitter 54 can be used to introduce the illumination light 78 along or near the imaging axis 62 in order to illuminate the inspection plane 72.

Furthermore, an optical correction plate 82 may be disposed along the imaging axis 62 at an azimuthally-orthogonal orientation with respect to the beam splitter 54 (i.e., the orientation of the optical correction plate 82 is that of the beam splitter 54 rotated by 90 degrees about the imaging axis 62), preferably between the beam splitter 54 and the image sensor 52, in order to correct for possible aberrations introduced by the beam splitter 54. Optionally, the optical correction plate 82 may also be used as part of an optical power measurement assembly 84. In such a case, the optical correction plate 82 may be provided with light separating optics 86 (e.g., a dichroic coating) for separating returning illumination light reflected by the fiber endfaces 110 from fiber-optic signal light exiting the fiber endfaces 110. The optical power of the separated fiber-optic signal light can then be measured using an optical power detector 88. Not shown in FIG. 5 is a spatial filter (e.g., a suitable aperture) that may be inserted along the light path between the optical correction plate 82 and the optical power detector 88 in order to block optical power exiting adjacent optical fibers to selectively measure the optical power of only one optical-fiber endface that is currently being inspected.

Figure 6A:
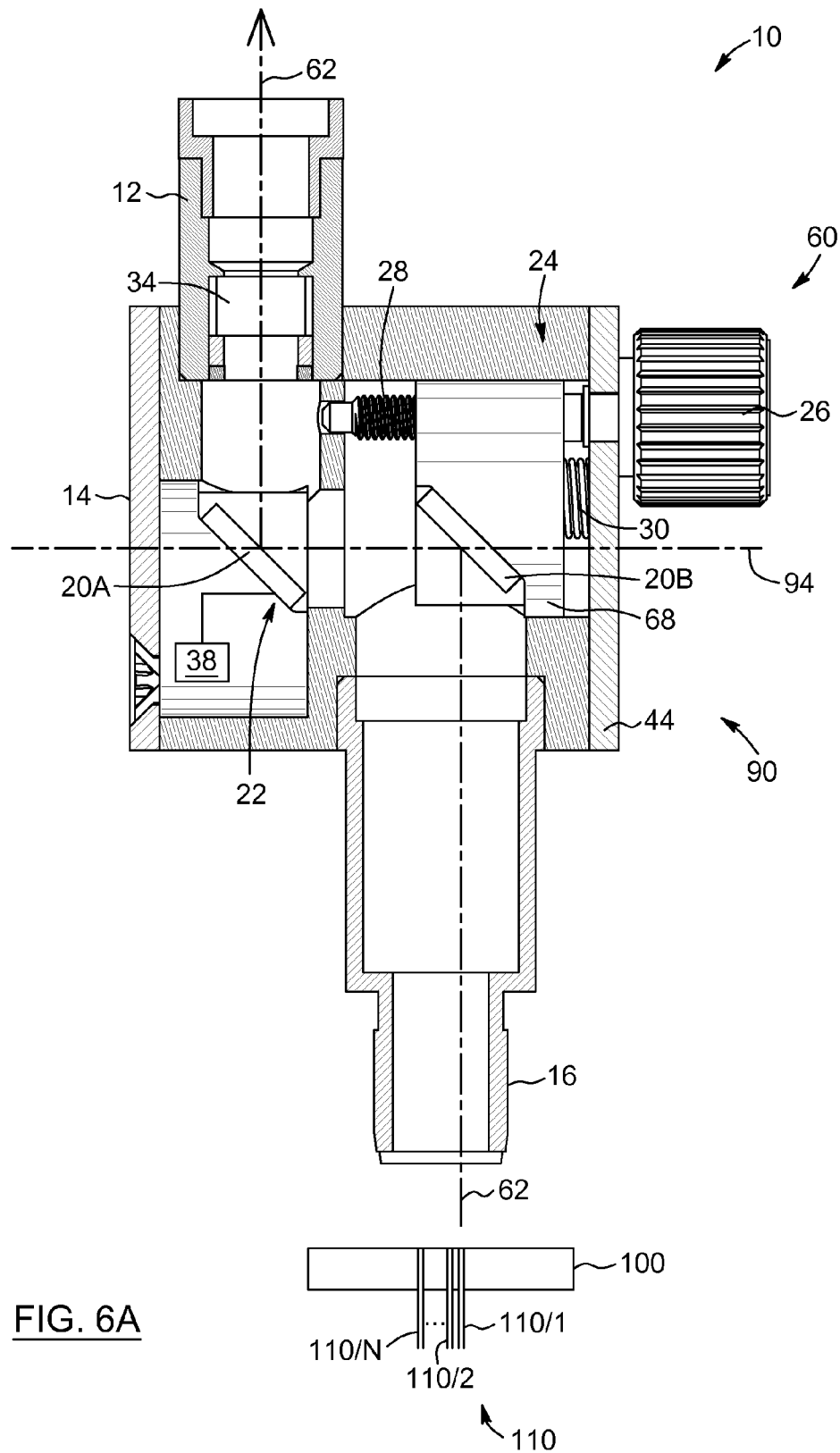
FIGS. 6A and 6B are cross-sectional views of the multiple-fiber inspection tip of FIG. 3. The dashed lines in FIGS. 6A and 6B correspond to the transverse displacement of the imaging axis as one of the mirrors is displaced by means of a lead-screw-driven mechanism. The imaging axes shown in FIGS. 6A and 6B terminate at two different inspection points on the inspection plane, which encompass, to within a focusing range, the optical-fiber endfaces 110/1 and 110/N, respectively.
Figure 6B:
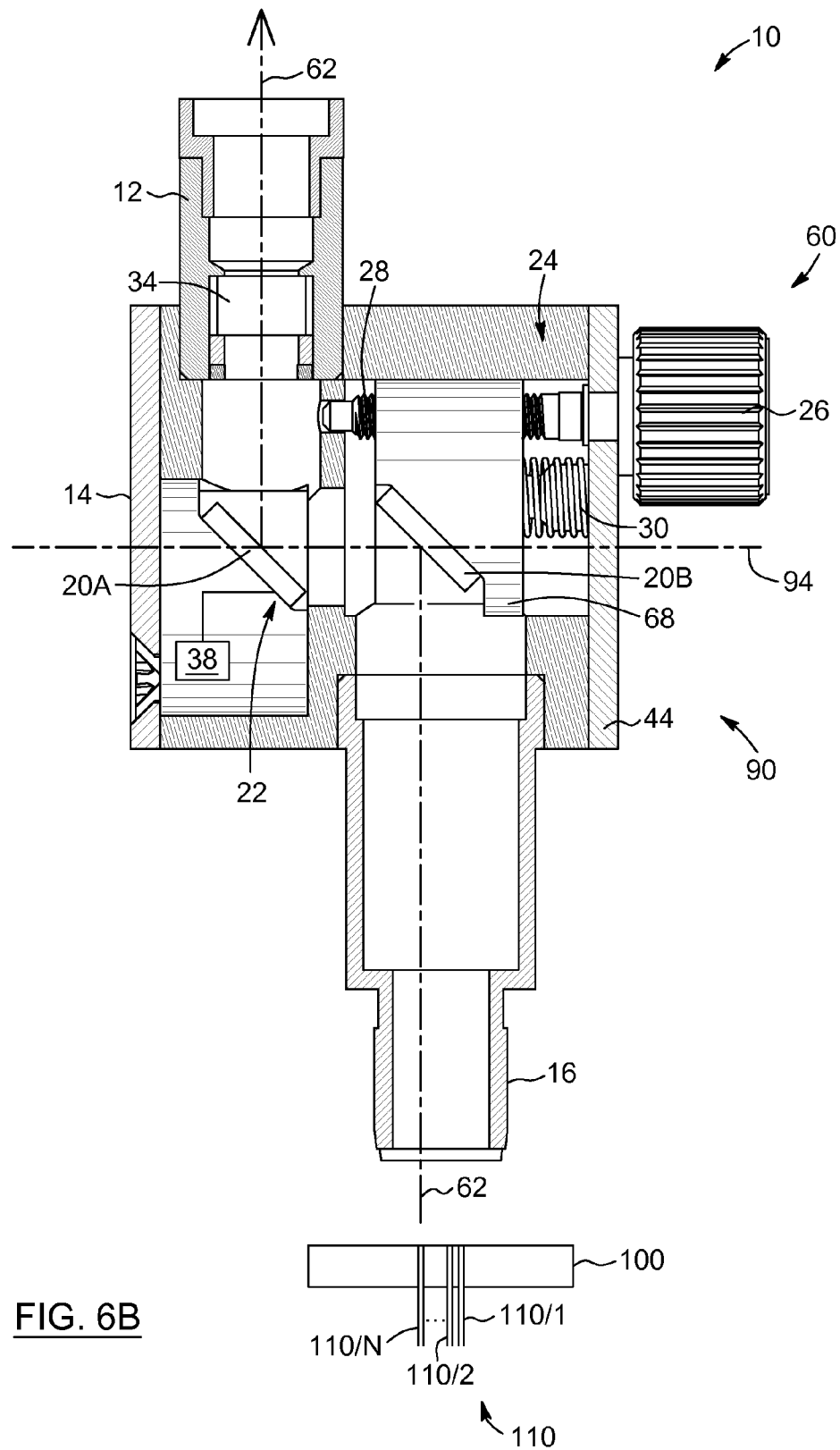

FIGS. 6A and 6B show respective views of the position of the second mirror 20B along the lead screw 28 of the actuator 60 for inspection of the first 110/1 and the last 110/N of the fiber endfaces of the MFC 100.

It will be understood that although the embodiment of FIGS. 1 to 6B employs a manually-actuated linear-motion device using a lead screw, it may be envisioned that, in another embodiment, the motion may be driven by means of an electrically-driven actuator without manual user intervention rather than a manually-driven lead-screw-driven mechanism. This could be achieved, for example, by motorizing the mirror translation inside the probe or the tip. This electrically-driven actuator could be controlled by software to provide fully automated inspection of the fiber endfaces with no or minimal user intervention, thereby significantly reducing the risk of human error.

As mentioned above, the embodiment of FIGS. 1 to 6B can displace the inspection point 64 across the inspection plane 72 while maintaining the mating interface 70 and the housing structure 32 mutually fixed with respect to the MFC 100 by using a two-parallel-mirror reflection-based lateral displacement of the imaging axis 62. However, other approaches may be envisioned, as will now be described below in reference to FIGS. 7 to 10.

Figure 7:
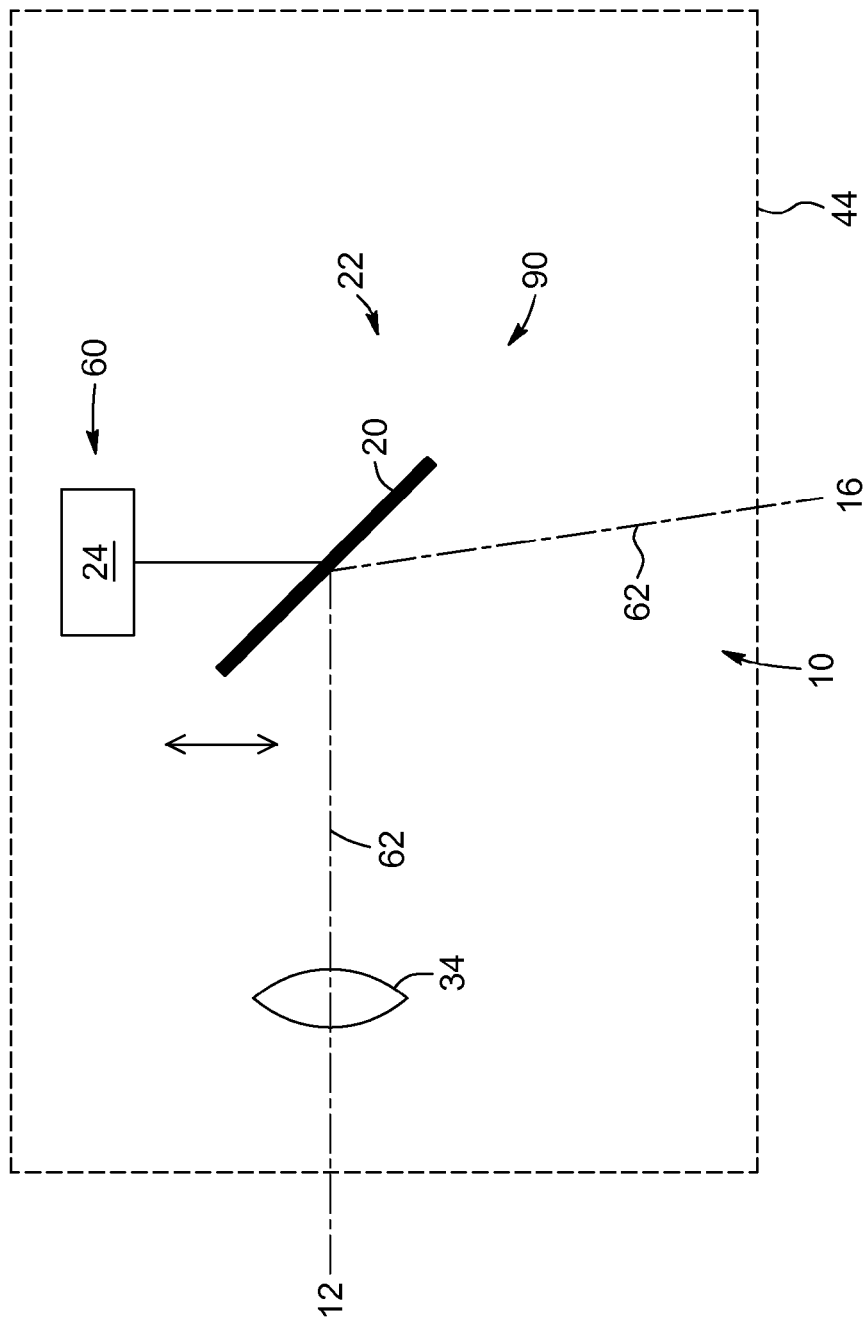
FIG. 7 is a schematic representation of another embodiment of the alignment module involving a linear translation of a mirror in a single-mirror optical configuration.

FIG. 7 depicts a configuration in which the alignment module 90 includes an optical element 22 embodied by a single mirror 20 provided inside the fiber inspection tip 10 (shown as being vertical in FIG. 7), and a linear actuating component 24 mechanically coupled to the single mirror 20 to translate the single mirror 20 relative to the tip housing 44 and the imaging axis 62 of a fiber inspection probe (not shown in FIG. 7) when the tip 10 is connected to the probe. It is to be noted that this configuration for the alignment module 90, if enclosed within the multiple-fiber inspection tip 10 (as shown schematically in FIG. 7), may not be optimal if one wishes to maintain the probe housing roughly in line with the bore of the bulkhead adapter 80, for instance. However, such a single-mirror configuration for the optical element 22 may be more appropriate if the alignment module 90 is disposed within the housing of the fiber inspection probe.

Figure 8:
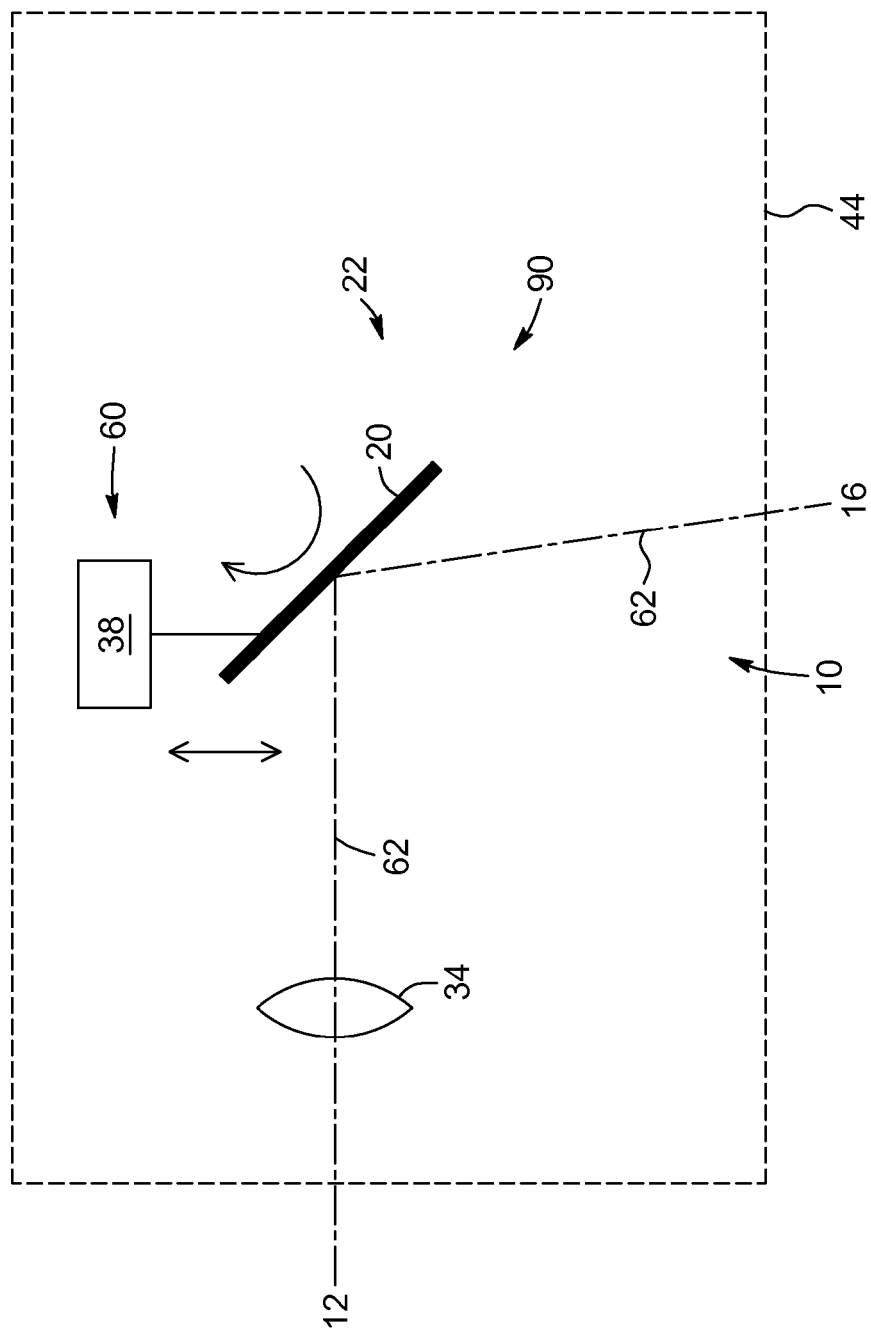
FIG. 8 is a schematic representation of another embodiment of the alignment module involving a rotation of a mirror in a single-mirror optical configuration.

FIG. 8 shows another alternative approach where the alignment module 90 includes on an optical element 22 embodied by a single mirror 20 provided inside the inspection tip 10, but where the actuator 60 includes a rotary actuating component 38 mechanically coupled to the single mirror 20 to rotate the single mirror 20 relative to the tip housing 44 and the imaging axis 62 of a fiber inspection probe (not shown) when the tip 10 is connected to the probe.

Figure 9:
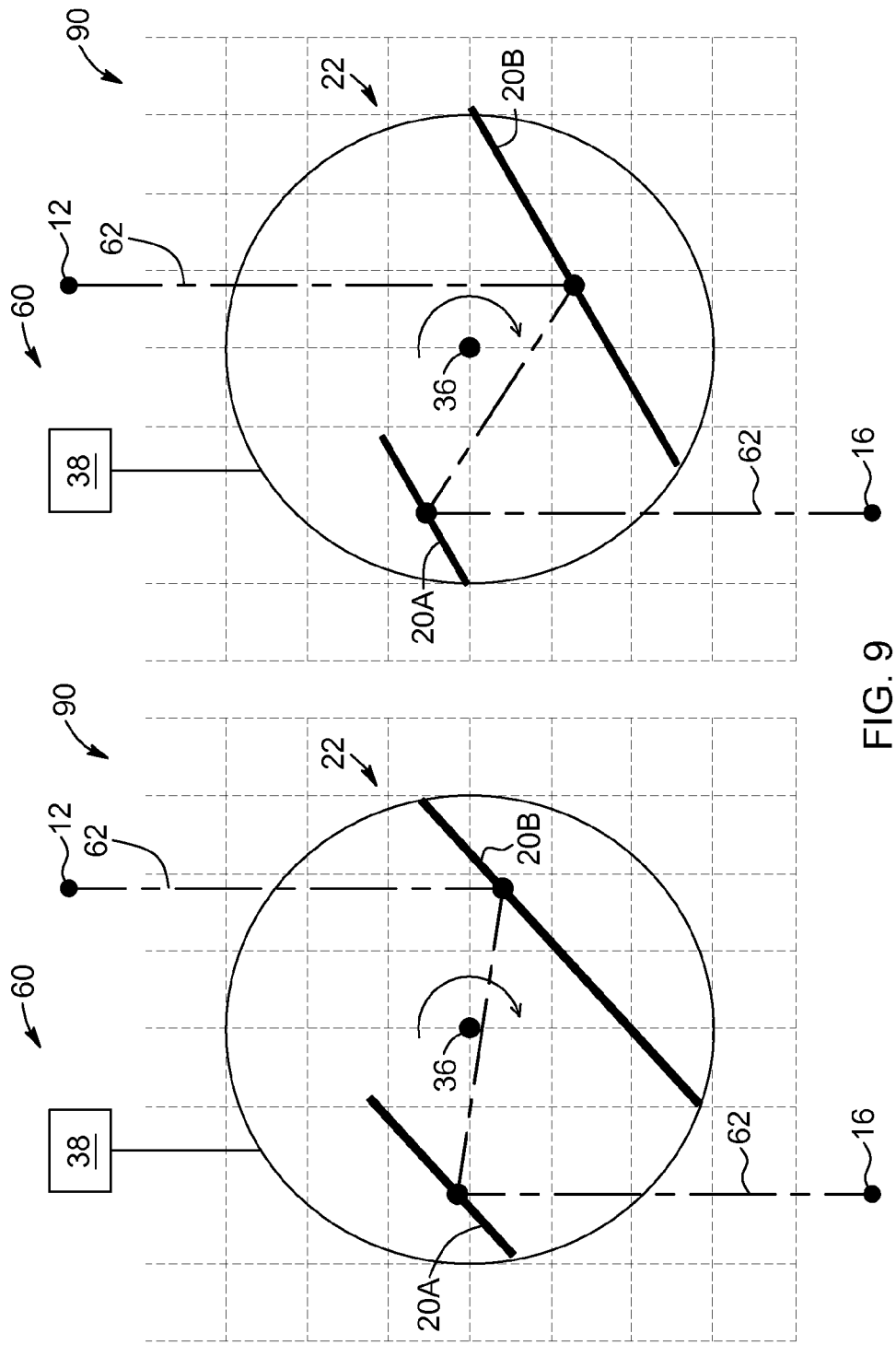
FIG. 9 is a schematic representation of another embodiment of the alignment module involving a rotation of two parallel mirrors about a common pivot axis.

FIG. 9 depicts a configuration of the alignment module 90 where the optical element 22 includes a first mirror 20A and a second mirror 20B parallel to each other, and where the actuator 60 includes a rotary actuating component 38 mechanically coupled to the first and second mirrors 20A, 20B to collectively rotate the first and second mirrors 20A, 20B about a common pivot axis 36. Other similar configurations of the alignment module 90 may employ multiple pivot points, linear displacements of the mirrors 20A, 20B, or combinations thereof. It will be understood that, as for the configuration of FIG. 5, the configuration of FIG. 9 may advantageously allow for the inspection probe housing to be aligned approximately along the bore of the bulkhead adapter.

Figure 10:
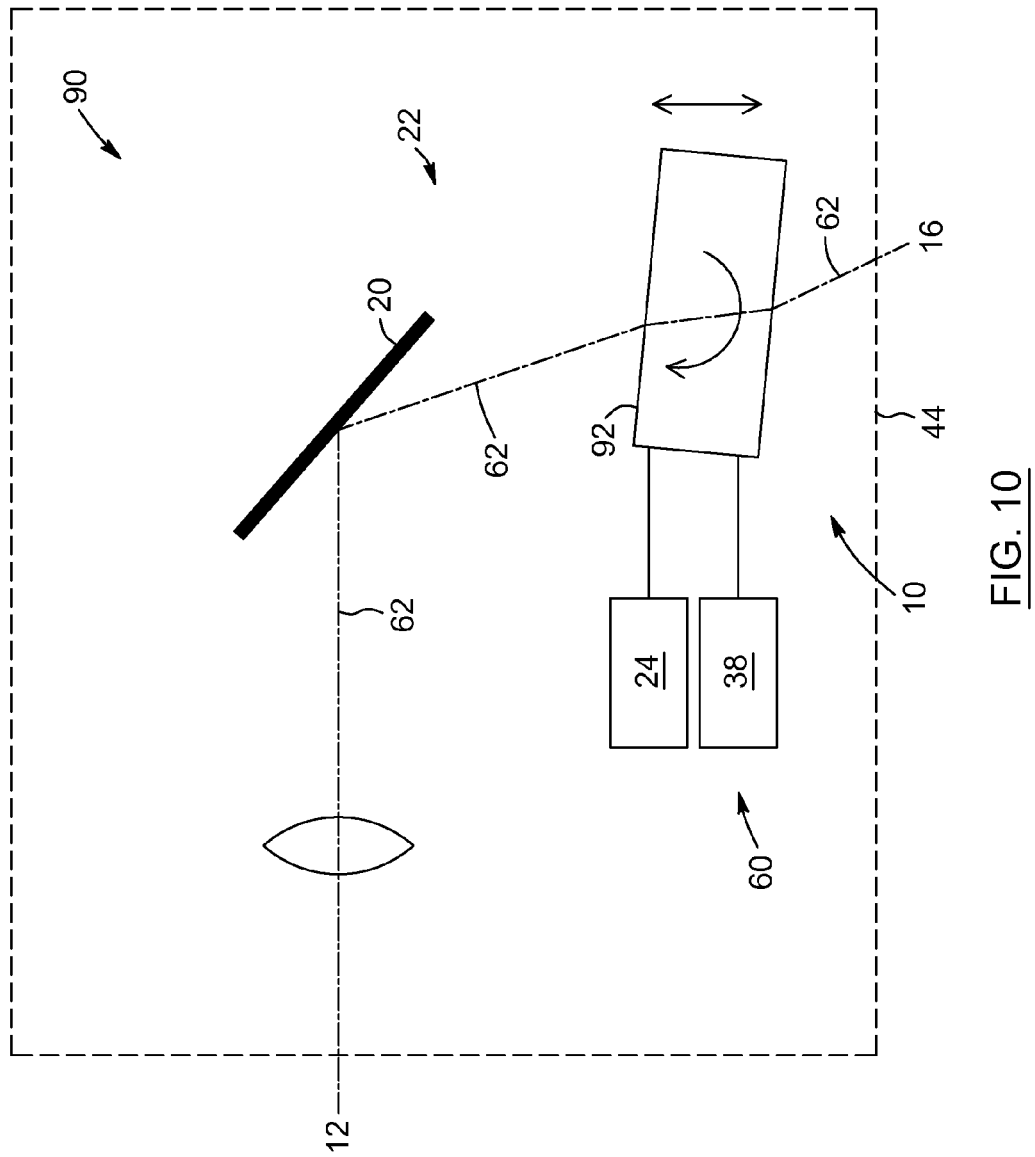
FIG. 10 is a schematic representation of another embodiment of the alignment module involving a rotation of a thick transparent plate.

The point of incidence of the imaging axis on the inspection plane encompassing the fiber endface to be inspected could also be displaced by non-normal incidence upon and transmission through a transmitting optical component 92. In this regard, FIG. 10 illustrates a configuration where the optical element 22 of the alignment module 90 includes, in addition to an angled-mirror 20, a transmitting optical component 92 (e.g., a thick glass plate) to provide the desired displacement of the imaging axis 62. In such a case, the actuator 60 can include both a linear actuating component 24 and a rotary actuating component 38 mechanically coupled to the transmitting optical component 92 to translate and rotate the transmitting optical component 92 relative to the housing structure, respectively. In other embodiments, the transmitting optical component 92 may be only translatable or only rotatable. Although such a configuration could be more prone to optical aberrations, the level of such aberrations might be acceptable according to the desired performance specifications. Otherwise, the addition of supplementary corrective optics to mitigate the effects of these aberrations may be envisioned, if desired.

In other embodiments, various combinations of reflective and transmissive optical components that can be set in motion through various linear and rotary actuating components can be implemented to displace the imaging axis, while maintaining the relative positions of the mating interface, housing structure and MFC-under-test.

In other embodiments (not shown in the drawings), the optical element may include an electro-optic element disposed along the imaging axis for use in transmission in this case. The actuator may then include an electro-optic actuating component (e.g., a suitable voltage generator) configured to control a refractive index of the optical element for the purpose of displacing the inspection point across the inspection plane. Such an optical element may include, for instance, an electro-optic liquid crystal material coupled to the electro-optic actuating component.

For each of the configurations of the optical element described above, the mating interface and the housing structure of the fiber inspection system (defined, e.g., by the probe housing and the tip housing) remain fixed relative to each other and relative to the MFC-under-test as the optical element is displaced by the actuator to selectively direct the imaging axis onto one or more fiber endfaces of the MFC-under-test.

Although most of the above-described embodiments employ a multiple-fiber inspection tip that may be releasably attached to the fiber inspection probe, it is envisaged that the opto-mechanical elements described above alternatively may be incorporated within the body of the probe, as described above.

The above-described embodiments are suitable for imaging fiber endfaces disposed linearly along the end surface of a multiple-fiber connector. For connectors including more than one "row" (i.e., a two-dimensional "array") of such endfaces, it would be conceptually straightforward to include, for example within the multiple-fiber inspection tip 10 of FIG. 1, additional opto-mechanical elements enabling a lateral displacement of the imaging axis perpendicularly to the displacement described above. For example, referring to FIGS. 3, 6A and 6B, the actuator 60 could include a rotary actuating component 38 mechanically coupled to the first and second mirrors 20A, 20B to collectively rotate the first and second mirrors 20A, 20B about a common pivot axis 94. This collective rotation of the first and second mirrors 20A, 20B in turn enables moving the inspection point 64 across the inspection plane 72 along a second direction 74B orthogonal to the first direction 74A. An example of such "arrayed" MFCs is a 72-fiber MTP®-brand connector, arranged in six rows of twelve fibers, which is manufactured and marketed by US Conec Ltd.

Figure 11:
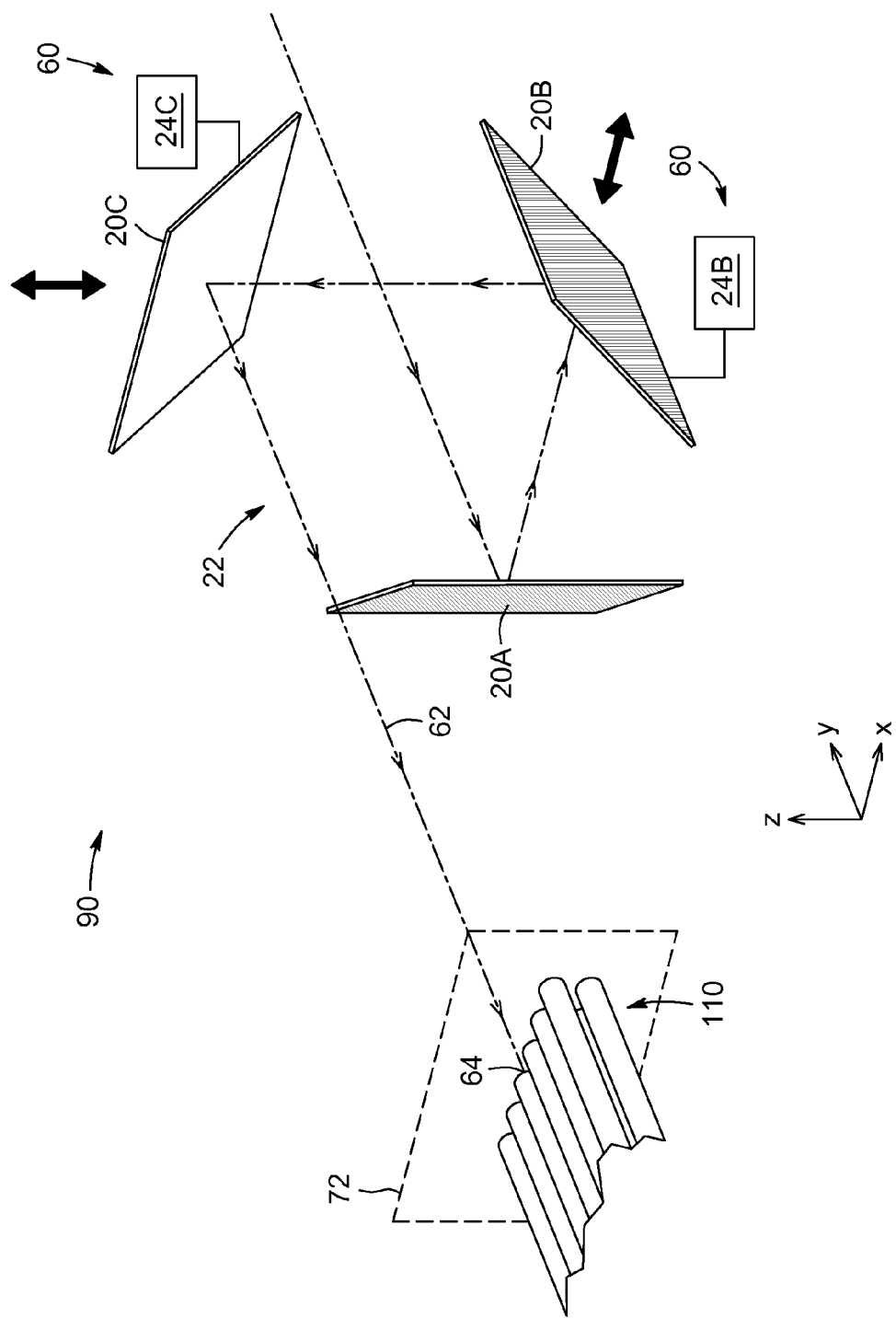
FIG. 11 is a schematic isometric view of another embodiment of the alignment module including an optical element embodied by three mirrors, of which two are linearly displaceable by the actuator to enable movement of the inspection point across the inspection plane along two mutually orthogonal directions.

Turning now to FIGS. 11, 12A and 12B, another embodiment of an alignment module 90 is illustrated that enables a displacement of the inspection point 64 across the inspection plane 72 along two orthogonal directions and, in turn, selective inspection of optical-fiber endfaces 110 arranged in a two-dimensional array. In the illustrated embodiment, the two orthogonal directions lie in a plane parallel to the x-z plane, and the array of optical-fiber endfaces 110 is provided as two rows of six optical-fiber endfaces 110. Of course, other optical-fiber endface configurations (e.g., 2×12 or 6×12) could be inspected using a similar embodiment.

The optical element 22 of the alignment module 90 includes a first, a second and a third mirror 20A, 20B and 20C whose normal vectors lie in planes parallel to the x-y, x-z and y-z planes, respectively. Each mirror 20A, 20B and 20C is preferably arranged to present an angle of incidence of 45 degrees for light propagating along the imaging axis 62. In the illustrated embodiments, the first mirror 20A is fixed and the second and third mirrors 20B, 20C are independently movable respectively along the x and z axes, respectively. For this purpose, the actuator 60 can include two linear actuating components 24B, 24C coupled to the second and third mirrors 20B, 20C to translate the second and third mirrors 20B, 20C along the x and z axes, respectively. As described above, various actuation technologies can be used for this purpose. In one embodiment, two independent lead-screw-driven mechanisms are employed as linear actuating components 24B, 24C.

FIG. 12A is a top plan view of FIG. 11 illustrating how a linear translation of the second mirror 20B results in a corresponding displacement of the inspection point 64 across the inspection plane 72 that enables selective inspection of the optical-fiber endfaces 110 along one row of the array (i.e., along a direction parallel to the x axis in FIG. 12A). Similarly, FIG. 12B is a right side elevation view of FIG. 11 illustrating how a linear translation of the third mirror 20C results in a corresponding displacement of the inspection point 64 across the inspection plane 72 that enables selective inspection of the optical-fiber endfaces 110 in different rows of the array (i.e., along a direction parallel to the z axis in FIG. 12B).

It will be understood that although the three-mirror configuration of FIGS. 11, 12A and 12B applies a linear translation to mirror 20B and to mirror 20C, a two-dimensional displacement of the inspection point 64 may also be obtained using the same three-mirror configuration but applying linear translations to another combination of two mirrors (e.g., mirrors 20A and 20B).

Those skilled in the art will also recognize that the three-mirror configuration illustrated in FIGS. 11, 12A and 12B is provided for exemplary purposes only and that other multi-mirror configurations involving one or more translatable and/or rotatable mirrors could be implemented to enable selective two-dimensional inspection of optical-fiber endfaces of MFCs. Alternatively, as a field technician may need to inspect such a two-dimensional "array" of fiber endfaces on only an occasional basis, it may be envisioned to use the imaging-axis displacement means according to embodiments of the present invention for one of the degrees of freedom (e.g., along each row of twelve endfaces in a 6×12 array), while employing an aforementioned existing displacement mechanism for the other one of the degrees of freedom (e.g., for selecting one or more of the six rows).

Furthermore, for connectors having only a small number of rows, it may be envisioned not to include any displacement mechanism for the degree of freedom corresponding to the different rows in the event that the imaging assembly has a sufficiently large field of view to image all fibers corresponding to a given column without any displacement.

Of course, numerous modifications could be made to the embodiments described above without departing from the scope of the present invention.

The invention claimed is:

1. A fiber inspection system for inspecting optical-fiber endfaces of a multiple-fiber connector, the fiber inspection system comprising:
    a housing structure;
    a mating interface held in a fixed relationship relative to the housing structure and configured to interface with the multiple-fiber connector; and
    an imaging assembly enclosed in the housing structure and defining an inspection plane and an image plane, at least a plurality of the optical-fiber endfaces being disposed on the inspection plane, to within a focusing range, when the multiple-fiber connector is mated to the mating interface, the imaging assembly defining an imaging axis between an inspection point on the inspection plane and a detection point on the image plane and comprising an alignment module disposed between the inspection plane and the image plane, the alignment module comprising an optical element and an actuator configured to act on the optical element to move the inspection point across the inspection plane for selectively inspecting one or more of the optical-fiber endfaces of the multiple-fiber connector.

2. The fiber inspection system according to claim 1, comprising a fiber inspection probe and a fiber inspection tip releasably connectable to each other and respectively comprising a probe housing and a tip housing that together define the housing structure, the mating interface being part of the fiber inspection tip.

3. The fiber inspection system according to claim 2, wherein the alignment module is enclosed within the tip housing.

4. The fiber inspection system according to claim 2, wherein the fiber inspection tip comprises corrective optics configured to adjust a focal length of the fiber inspection probe between a nominal value and a corrected value when the fiber inspection tip is connected to the fiber inspection probe, the corrected value corresponding to a focal length of the fiber inspection system.

5. The fiber inspection system according to claim 1, wherein the actuator comprises an electrically-driven actuator.

6. The fiber inspection system according to claim 1, wherein:
    the optical element comprises a first mirror and a second mirror parallel to each other; and
    the actuator comprises a linear actuating component mechanically coupled to the second mirror to translate the second mirror relative to the first mirror.

7. The fiber inspection system according to claim 6, wherein the linear actuating component comprises:
    a base on which the second mirror is mounted; and
    a lead screw rotatably engaging the base such that axial rotation of the lead screw linearly displaces the base along the lead screw, thereby causing translation of the second mirror relative to the first mirror in order to move the inspection point across the inspection plane along a first direction.

8. The fiber inspection system according to claim 7, wherein the actuator further comprises a rotary actuating component mechanically coupled to the first and second mirrors to rotate the first and second mirrors collectively about a common pivot axis in order to move the inspection point across the inspection plane along a second direction orthogonal to the first direction.

9. The fiber inspection system according to claim 1, wherein the optical element comprises a single mirror, and wherein the actuator comprises at least one of a linear actuating component and a rotary actuating component mechanically coupled to the single mirror to effect at least one of a translation and a rotation of the single mirror relative to the housing structure.

10. The fiber inspection system according to claim 1, wherein the imaging assembly comprises:
    imaging optics disposed along the imaging axis to bring the inspection point on the inspection plane into focus on the image plane; and
    an image sensor having a detection surface positioned at the image plane to acquire an image of the one or more selected optical-fiber endfaces of the multiple-fiber connector.

11. The fiber inspection system according to claim 1, comprising an illumination source configured to project illumination light onto the one or more selected optical-fiber endfaces of the multiple-fiber connector during inspection thereof.

12. A fiber inspection tip connectable to a fiber inspection probe for inspecting optical-fiber endfaces of a multiple-fiber connector, the fiber inspection probe having a probe housing and defining, together with and when connected to the fiber inspection tip, an inspection plane and an image plane, the fiber inspection tip comprising:

a mating interface configured to interface with the multiple-fiber connector so that, when the fiber inspection tip is connected to the fiber inspection probe, the mating interface is held in a fixed relationship with the probe housing and at least a plurality of the optical-fiber endfaces of the multiple-fiber connector is disposed on the inspection plane, to within a focusing range; and an alignment module disposed between the inspection plane and the image plane and providing, together with and when connected to the fiber inspection probe, an imaging axis between an inspection point on the inspection plane and a detection point on the image plane, the alignment module comprising an optical element and an actuator configured to act on the optical element to move the inspection point across the inspection plane for selectively inspecting one or more of the optical-fiber endfaces of the multiple-fiber connector.

13. The fiber inspection tip according to claim 12, further comprising corrective optics configured to adjust a focal length of the fiber inspection probe between a nominal value and a corrected value when the fiber inspection tip is connected to the fiber inspection probe.

14. The fiber inspection tip according to claim 12, wherein the actuator comprises an electrically-driven actuator.

15. The fiber inspection tip according to claim 12, wherein:
the optical element comprises a first mirror and a second mirror parallel to each other; and
the actuator comprises a linear actuating component mechanically coupled to the second mirror to translate the second mirror relative to the first mirror.

16. The fiber inspection tip according to claim 15, wherein the linear actuating component comprises:
a base on which the second mirror is mounted; and
a lead screw rotatably engaging the base such that axial rotation of the lead screw linearly displaces the base along the lead screw, thereby causing translation of the second mirror relative to the first mirror in order to move the inspection point across the inspection plane along a first direction.

17. The fiber inspection tip according to claim 16, wherein the actuator further comprises a rotary actuating component mechanically coupled to the first and second mirrors to collectively rotate the first and second mirrors about a common pivot axis in order to move the inspection point across the inspection plane along a second direction orthogonal to the first direction.

18. The fiber inspection tip according to claim 12, wherein the optical element comprises a single mirror, and wherein the actuator comprises at least one of a linear actuating component and a rotary actuating component mechanically coupled to the single mirror to effect at least one of a translation and a rotation of the single mirror relative to the housing structure.

* * * * *